(12) United States Patent
Yokoyama et al.

(10) Patent No.: US 11,148,048 B2
(45) Date of Patent: Oct. 19, 2021

(54) CONTENT PRESENTATION SYSTEM, CONTENT PRESENTATION DEVICE, AND WIND PRESENTING DEVICE

(71) Applicant: SONY CORPORATION, Tokyo (JP)

(72) Inventors: Ryo Yokoyama, Tokyo (JP); Osamu Ito, Tokyo (JP); Naohide Miyamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 127 days.

(21) Appl. No.: 16/483,499

(22) PCT Filed: Feb. 8, 2018

(86) PCT No.: PCT/JP2018/004333
§ 371 (c)(1),
(2) Date: Aug. 5, 2019

(87) PCT Pub. No.: WO2018/163700
PCT Pub. Date: Sep. 13, 2018

(65) Prior Publication Data
US 2021/0016164 A1    Jan. 21, 2021

(30) Foreign Application Priority Data
Mar. 7, 2017    (JP) .............................. JP2017-042565

(51) Int. Cl.
*H04R 1/02* (2006.01)
*A63F 13/285* (2014.01)
*H04R 9/00* (2006.01)

(52) U.S. Cl.
CPC ........... *A63F 13/285* (2014.09); *H04R 1/028* (2013.01); *H04R 9/00* (2013.01); *H04R 2209/00* (2013.01);
(Continued)

(58) Field of Classification Search
CPC ...... H04R 1/028; H04R 9/00; H04R 2209/00; H04R 2400/11; A63F 13/285
See application file for complete search history.

(56) References Cited

U.S. PATENT DOCUMENTS

| 7,039,212 | B2 * | 5/2006 | Poling ................. | H04R 1/2826 |
| | | | | 181/149 |
| 2008/0153590 | A1 * | 6/2008 | Ombrellaro .............. | F41H 1/02 |
| | | | | 463/30 |

(Continued)

FOREIGN PATENT DOCUMENTS

| EP | 3068202 A1 | 9/2016 |
| WO | WO2017002435 A1 * | 1/2017 |

*Primary Examiner* — Tuan D Nguyen
(74) *Attorney, Agent, or Firm* — Paratus Law Group, PLLC

(57) ABSTRACT

There is provided a content presentation system, a content presentation device, and a wind presenting device which are suitable for content presentation by air blast. The content presentation system includes a control unit and a wind presenting device. The control unit generates a wind presentation drive signal on the basis of a predetermined trigger included in content. The wind presenting device includes a housing including an opening formed therein, a diaphragm supported by the housing, and a diaphragm drive mechanism that drives the diaphragm on the basis of the wind presentation drive signal, reduces a volume of a space formed by the housing and the diaphragm, and causes air in the space to blast from the opening.

13 Claims, 22 Drawing Sheets

(52) U.S. Cl.
CPC ...... *H04R 2400/03* (2013.01); *H04R 2400/11* (2013.01)

(56) References Cited

U.S. PATENT DOCUMENTS

| | | | |
|---|---|---|---|
| 2009/0041282 A1* | 2/2009 | Parker | H04R 9/022 381/345 |
| 2011/0125291 A1* | 5/2011 | Tompkins | A61F 2/78 623/34 |
| 2011/0206231 A1* | 8/2011 | Yoshida | H04R 31/003 381/397 |
| 2017/0228026 A1* | 8/2017 | Goslin | G06T 19/006 |
| 2018/0109658 A1* | 4/2018 | Le | H04M 1/03 |

\* cited by examiner (a)

(b)

(c)

CONTENT PRESENTATION SYSTEM, CONTENT PRESENTATION DEVICE, AND WIND PRESENTING DEVICE

CROSS REFERENCE TO PRIOR APPLICATION

This application is a National Stage Patent Application of PCT International Patent Application No. PCT/JP2018/004333 (filed on Feb. 8, 2018) under 35 U.S.C. § 371, which claims priority to Japanese Patent Application No. 2017-042565 (filed on Mar. 7, 2017), which are all hereby incorporated by reference in their entirety.

TECHNICAL FIELD

The present technology relates to a content presentation system, a content presentation device, and a wind presenting device which are capable of presenting a wind to a user as content.

BACKGROUND ART

In recent years, a new content presentation method of presenting a tactile sense in tune with video and sound has attracted attention. For example, by letting each of users possess a tactile sense presentation device and gives an indication of a tactile sense presentation timing to each tactile sense presentation device from a control device that reproduces a video or the like, it is possible to present a tactile sense to the user in accordance with the progress of a video or a sound.

A device that generates vibration is generally used as a tactile sense presentation device. For example, information processing of presenting a tactile sense using vibration as a notification to a user is disclosed in Patent Literature 1.

CITATION LIST

Patent Literature

Patent Literature 1: JP-A-2016-131306

DISCLOSURE OF INVENTION

Technical Problem

In addition to the tactile sense presentation using vibration disclosed in Patent Literature 1, wind presentation is under review. For example, it is possible to present a user experience with a realistic sensation by performing air blast to a user in accordance with an explosion scene of a moving picture or a game.

A fan is generally used as a blast means. However, it takes time for the fan to reach a predetermined number of resolutions, and it is difficult to send air instantaneously. If a fan with a small diameter is used, it is possible to improve responsiveness, but there is a problem in which noise occurs. In addition, when a fan is used, it is difficult to arbitrarily change a wind intensity or a wind frequency.

In light of the foregoing, it is an object of the present technology to provide a content presentation system, a content presentation device, and a wind presenting device which are suitable for content presentation by air blast.

Solution to Problem

In order to achieve the above object, a content presentation system according to an aspect of the present technology includes a signal generating unit and a wind presenting device.

The signal generating unit generates a wind presentation drive signal on the basis of a predetermined trigger included in content.

The wind presenting device includes a housing including an opening formed therein, a diaphragm supported by the housing, and a diaphragm drive mechanism that drives the diaphragm on the basis of the wind presentation drive signal, reduces a volume of a space formed by the housing and the diaphragm, and causes air in the space to blast from the opening.

According to this configuration, as the diaphragm vibrates, the volume of the space surrounded by the housing and the diaphragm decreases, and the air in the space blasts from the opening, so that the air blasts to the user. In a general air blast mechanism such as a fan, it takes time for the fan to reach a predetermined number of resolutions, but in the present configuration, it is possible to cause air to blast instantaneously. In addition, as the signal generating unit generates drive vibration for wind presentation on the basis of the predetermined trigger included in the content, the air blast is performed in association with an event (an explosive scene or the like) in the content, and thus it is possible to cause the user to have a new experience.

The signal generating unit may include a presentation data generating unit that generates wind data from the content, a wind data processing unit that modulates the wind data in tune with the wind presenting device, and a wind presenting unit that generates the wind presentation drive signal on the basis of the wind data modulated by the wind data processing unit.

According to this configuration, since the wind data processing unit modulates the wind data generated from the content by the presentation data generating unit in tune with the wind presenting device, it is possible to generate the wind presentation drive signal in accordance with the configuration of the wind presenting device.

The content presentation system may further include a tactile sense presenting device that presents a tactile sense to the user, the signal generating unit may generate a tactile sense presentation drive signal on the basis of a predetermined trigger included in the content, and the tactile sense presenting device may present the tactile sense to the user in accordance with the tactile sense presentation drive signal.

According to this configuration, it is possible to present the wind to the user from the wind presenting device while presenting the tactile sense (vibration, an electric tactile sense, temperature, or the like) from the tactile sense presenting device.

The content presentation system may further include a sound presenting device that presents a sound to the user, and the signal generating unit may generate a sound presentation drive signal on the basis of a predetermined trigger included in the content, and the sound presenting device may present a sound to the user in accordance with the sound presentation drive signal.

According to this configuration, it is possible to present the wind to the user from the wind presenting device while presenting the sound from the sound presenting device.

The opening may include a plurality of openings.

With this configuration, the wind presenting device can cause air to simultaneously blast from a plurality of openings in a plurality of directions. Also, when the plurality of openings have different opening sizes or shape, it is possible to simultaneously output winds with different characteristics from the plurality of openings.

The opening may include a first opening and a second opening, and the wind presenting device may further include a first check valve for passing air flowing into the housing from the first opening and a second check valve for passing air to blast from the second opening.

According to this configuration, the first opening can be dedicated to intake, and the second opening can be dedicated to exhaust. Since the wind flows in one direction as compared with a case in which one opening is formed, the output wind can reach far, and it is possible to increase the output intensity of the wind. Further, the responsiveness of the wind is improved, and the wind frequency (the number of air blasts and stops per unit time) can be increased (the interval can be decreased).

The opening may include a first opening and a second opening, and the wind presenting device may include a first propeller for passing air flowing into the housing from the first opening, a second propeller for passing air to blast from the second opening, and a common shaft of the first propeller and the second propeller.

According to this configuration, the first opening can be dedicated to intake, and the second opening can be dedicated to exhaust. Since the wind flows in one direction as compared with a case in which one opening is formed, the output wind can reach far, and it is possible to increase the output intensity of the wind. Further, the responsiveness of the wind is improved, and the wind frequency (the number of air blasts and stops per unit time) can be increased (the interval can be decreased).

The wind presenting device may generate a sound by vibration of the diaphragm.

According to this configuration, it is possible to use the wind presenting device as the sound presenting device.

The wind presenting device may further include a temperature changing element which is installed in the housing and changes a temperature of the air in the space.

According to this configuration, it is possible to adjust the temperature of the wind blasting from the wind presenting device, and it is possible to cause the warm wind or the cold wind to blast.

The signal generating unit may change the temperature of the temperature changing element on the basis of the content.

According to this configuration, it is possible to adjust the temperature of the wind blasting from the wind presenting device in accordance with the substance of the content.

The wind presenting device may further include a barometric pressure sensor which is installed in the housing and measures barometric pressure in the space, and the signal generating unit may generate a wind presentation drive signal on the basis of an output of the barometric pressure sensor.

According to this configuration, it is possible to adjust the strength of the wind blasting from the wind presenting device in accordance with the barometric pressure in the housing measured by the barometric pressure sensor.

The wind presenting device may further include a temperature sensor which is installed in the housing and measures a temperature in the space, and the signal generating unit generates a wind presentation drive signal on the basis of the output of the temperature sensor.

According to this configuration, it is possible to adjust the temperature of the wind blasting from the wind presenting device in accordance with the temperature in the housing measured by the barometric pressure sensor.

The wind presenting device may include a valve capable of opening and closing the opening, and the signal generating unit may control the diaphragm drive mechanism such that the barometric pressure in the space is increased, and the valve is opened on the basis of a predetermined trigger included in the content.

According to this configuration, it is possible to cause the wind with the fast wind speed to blast by pressurizing the air in the housing and opening the valve on the basis of the trigger.

In order to achieve the above object, a content presentation device according to an aspect of the present technology includes a wind presenting device, a tactile sense presenting device, and a sound presenting device.

The wind presenting device includes a housing including an opening formed therein, a diaphragm supported by the housing, and a diaphragm drive mechanism that reduces a volume of a space formed by the housing and the diaphragm, and causes air in the space to blast from the opening.

The tactile sense presenting device presents a tactile sense to the user.

The sound presenting device presents a sound to the user.

In order to achieve the above object, a wind presenting device according to an aspect of the present technology includes a housing, a diaphragm, and a diaphragm drive mechanism.

The housing includes an opening formed therein.

The diaphragm is supported by the housing.

The diaphragm drive mechanism drives the diaphragm, reduces a volume of a space formed by the housing and the diaphragm, and causes air in the space to blast from the opening.

Advantageous Effects of Invention

As described above, according to the present technology, it is possible to provide a content presentation system, a content presentation device, and a wind presenting device which are suitable for content presentation by air blast. Note that the effects described herein are not necessarily limited, and any of effects described in the present disclosure may be included.

MODE(S) FOR CARRYING OUT THE INVENTION

[Configuration of Content Presentation Device]

Figure 1:
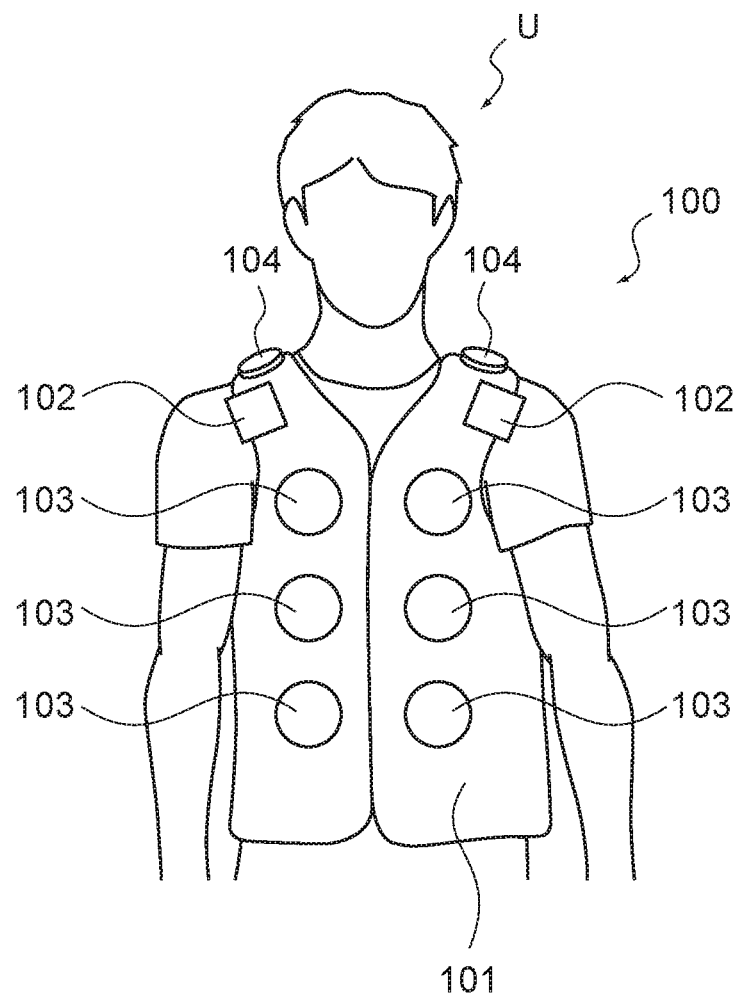
FIG. 1 is a schematic view of a content presentation device according to an embodiment of the present technology.

A content presentation device according to an embodiment of the present technology will be described in detail. FIG. 1 is a schematic view of a content presentation device 100 according to the present embodiment. As illustrated in FIG. 1, a content presentation device 100 is a vest type device wearable by the user U.

The content presentation device 100 includes a support member 101, a wind presenting device 102, a tactile sense presenting device 103, and a sound presenting device 104.

The support member 101 is configured to be wearable by the user. The support member 101 is, for example, a vest type but is not limited thereto as long as it is a type which can be worn by the user such as a belt type or a shoulder type. Also, as will be described later, the support member 101 may be a member which can be gripped by the user.

The wind presenting device 102 presents the wind to a user U. A configuration of the wind presenting device 102 will be described later. The number of wind presenting devices 102 or an arrangement thereof is not particularly limited, but it is desirable that the wind presenting device 12 be arranged in the vicinity of the face of the user U.

The tactile sense presenting device 103 presents a tactile sense to the user U. The tactile sense presenting device 103 is a device that presents a tactile sense to the user by vibration, electrical stimulation, heating, or the like. The tactile sense presented from the tactile sense presenting device 103 to the user may be any of vibration, temperature, pain, force, or the like. The number of tactile sense presenting devices 103 or an arrangement thereof is not particularly limited.

The sound presenting device 104 is a speaker or the like and presents a sound to the user. The number arrangement of the sound presenting devices 104 or an arrangement thereof is not particularly limited.

[Configuration of Wind Presenting Device]

Figure 2:
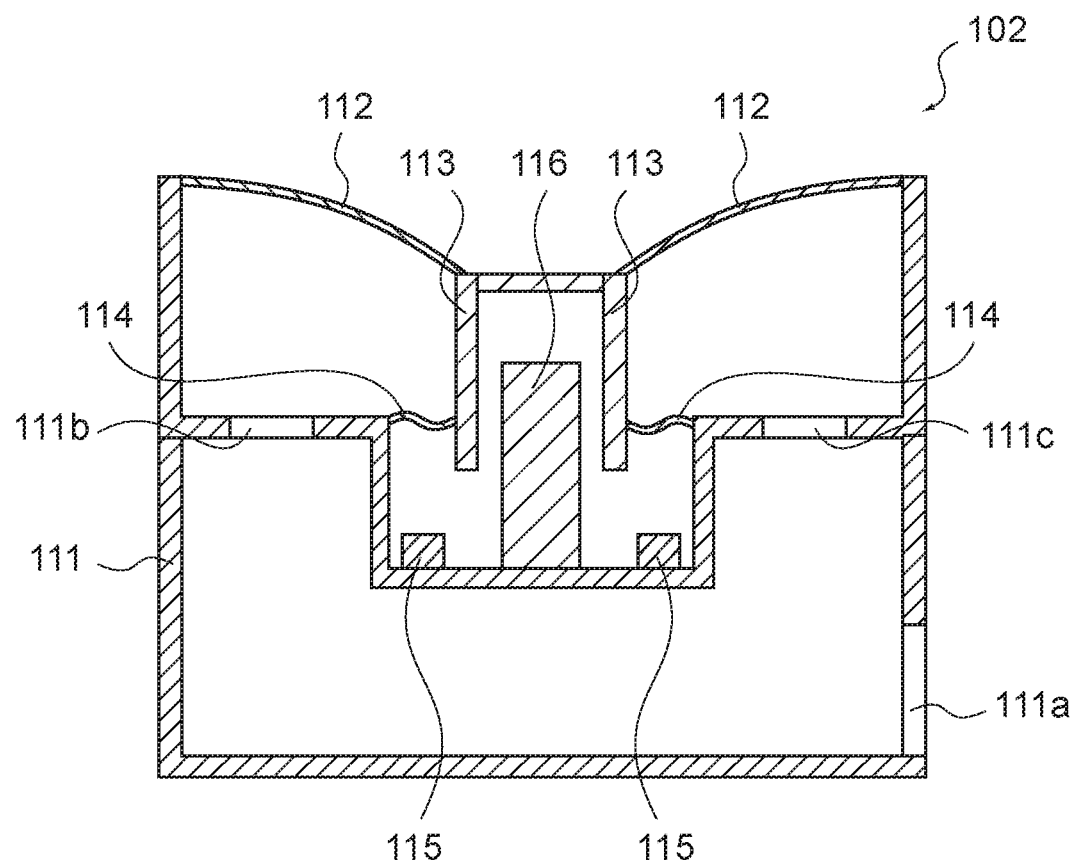
FIG. 2 is a cross-sectional view of a wind presenting device included in the same content presentation device.

FIG. 2 is a schematic view illustrating a specific configuration of the wind presenting device 102. As illustrated in FIG. 2, the wind presenting device 102 includes a housing 111, a diaphragm 112, a coil 113, a damper 114, a magnet 115 and an axis core 116.

The housing 111 is a member fixed to the support member 101. The housing 111 includes an opening 111a communicating with the inside and the outside of the housing 111, and an opening 111b and an opening 111c formed inside the housing 111. The housing 111 has, for example, a cylindrical shape and can be made of synthetic resin or metal. Various types of sensors such as a barometric pressure sensor for measuring barometric pressure in the housing 111 or a temperature sensor for measuring a temperature in the housing 111 may be installed in the housing 111.

The diaphragm 112 is supported by the housing 111 and configured to be vibratable with respect to the housing 111. The diaphragm 112 is a plate-like member made of paper, synthetic resin, metal, or the like.

The coil 113 is connected to a central part of the diaphragm 112. A wire (not illustrated) is connected to the coil 113, and electromagnetic force is generated by an electric current supplied from the wire.

The damper 114 connects the housing 111 with the coil 113 and supports the coil 113 to be vibratable with respect to the housing 111. The damper 114 can be made of a flexible material such as synthetic resin. It is desirable that the damper 114 be softer than a general damper used in the sound presenting device. Further, the damper 114 may have a configuration in which softness is electrically adjustable.

The magnet 115 is fixed to the housing 111 and causes magnetic force to act between the magnet 115 and the coil 113. The magnet 115 has, for example, an annular shape.

The axis core 116 is fixed to the housing 111 and improves a magnetic field of the coil 113. The axis core 116 is made of a magnetic material and is arranged at a winding center of the coil 113.

[Operation of Wind Presenting Device]

Figure 3:
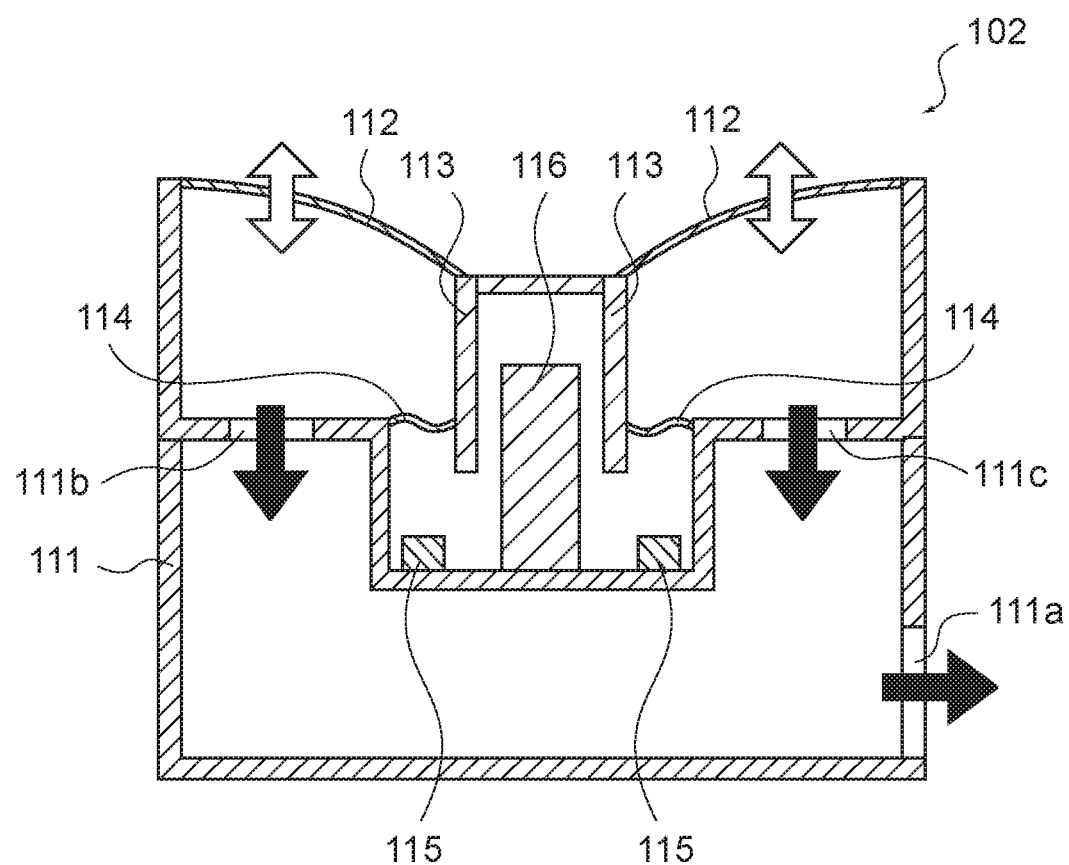
FIG. 3 is a schematic view illustrating an operation of a wind presenting device included in the same content presentation device.

FIG. 3 is a schematic view illustrating an operation of the wind presenting device 102. If an electric current is supplied to the coil 113, the magnetic force acts between the coil 113 and the magnet 115, and the coil 113 is attracted to the magnet 115. The diaphragm 112 approaches the housing 111 along with the coil 113 (white arrows in FIG. 3).

Accordingly, the volume of a space surrounded by the housing 111 and the diaphragm 112 decreases, and the air in the housing 111 passes through the opening 111b and the opening 111c and blasts from the opening 111a (black arrow in the figure). Accordingly, the air blasts from the opening 111a.

Figure 4:
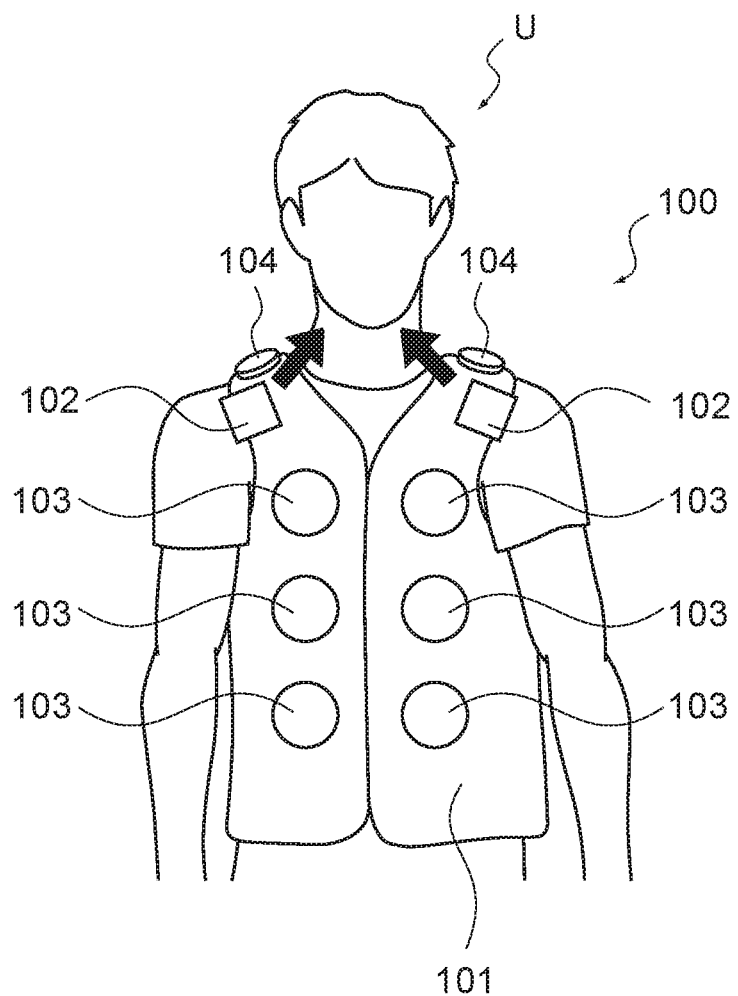
FIG. 4 is a schematic view illustrating an operation of the same content presentation device.

FIG. 4 is a schematic view illustrating a form of wind presentation to the user U. As illustrated in FIG. 4, the winds (arrows in FIG. 4) are presented from the wind presenting device 102 to the user U. Note that timings at which the winds are presented from a plurality of wind presenting devices 102 may be different from each other. Also, a tactile sense and a sound may be presented to the user U from the tactile sense presenting device 103 and the sound presenting device 104 together with the wind presentation from the wind presenting device 102.

Figure 5:
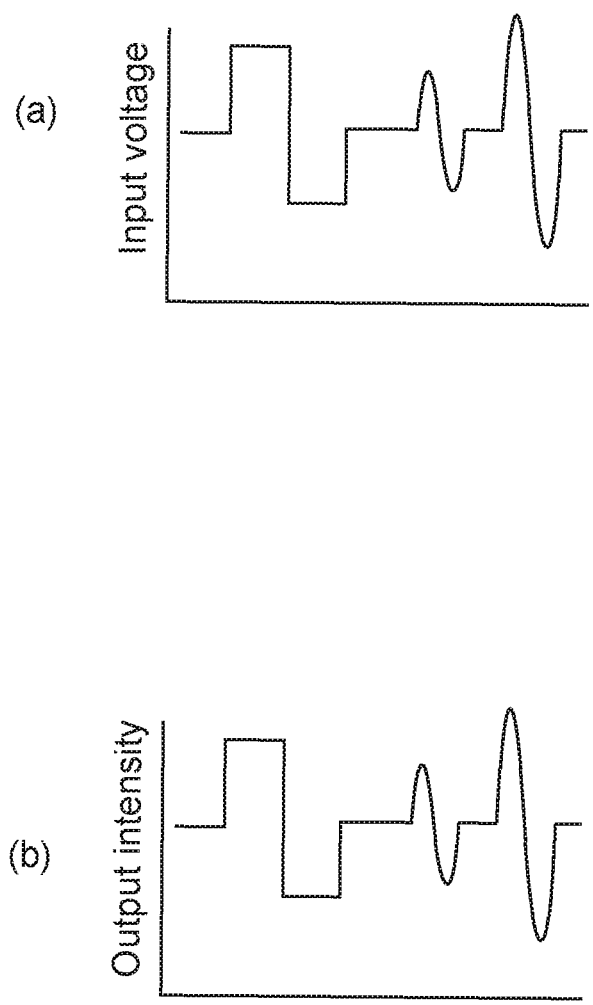
FIG. 5 is a graph illustrating an input voltage to a coil of a wind presenting device provided in the same content presentation device and an output intensity of a wind output from a wind presenting device.

As described above, the air blast can be controlled by the electric current supply to the coil 113. FIG. 5 is a graph illustrating an input voltage to the coil 113 and an output intensity of the wind. If an input voltage is applied with a waveform illustrated in FIG. 5(*a*), a wind corresponding to the input voltage is output as illustrated in FIG. 5(*b*).

Since the movement of the diaphragm 112 is high speed, it is possible to increase the responsiveness of the air blast. Also, it is possible to adjust the wind intensity and the frequency (the number of air blast per fixed time) by adjusting the electric current supply to the coil 113.

Note that although the wind presenting device 102 has been described as driving the diaphragm 112 using the magnetic force action of the coil 113 and the magnet 115, the present invention is not limited thereto. The wind presenting device 102 may include another diaphragm drive mechanism capable of driving the diaphragm 112. Specifically, the diaphragm 112 may be driven by a piezo element or compressed air stored in advance. Further, a valve may be installed in the opening 111*a*, and after the barometric pressure in the housing 111 is increased by the diaphragm drive mechanism, the valve may be opened at a predetermined timing to send a wind having a high wind velocity.

[Functional Configuration of Content Presentation System]

Figure 6:
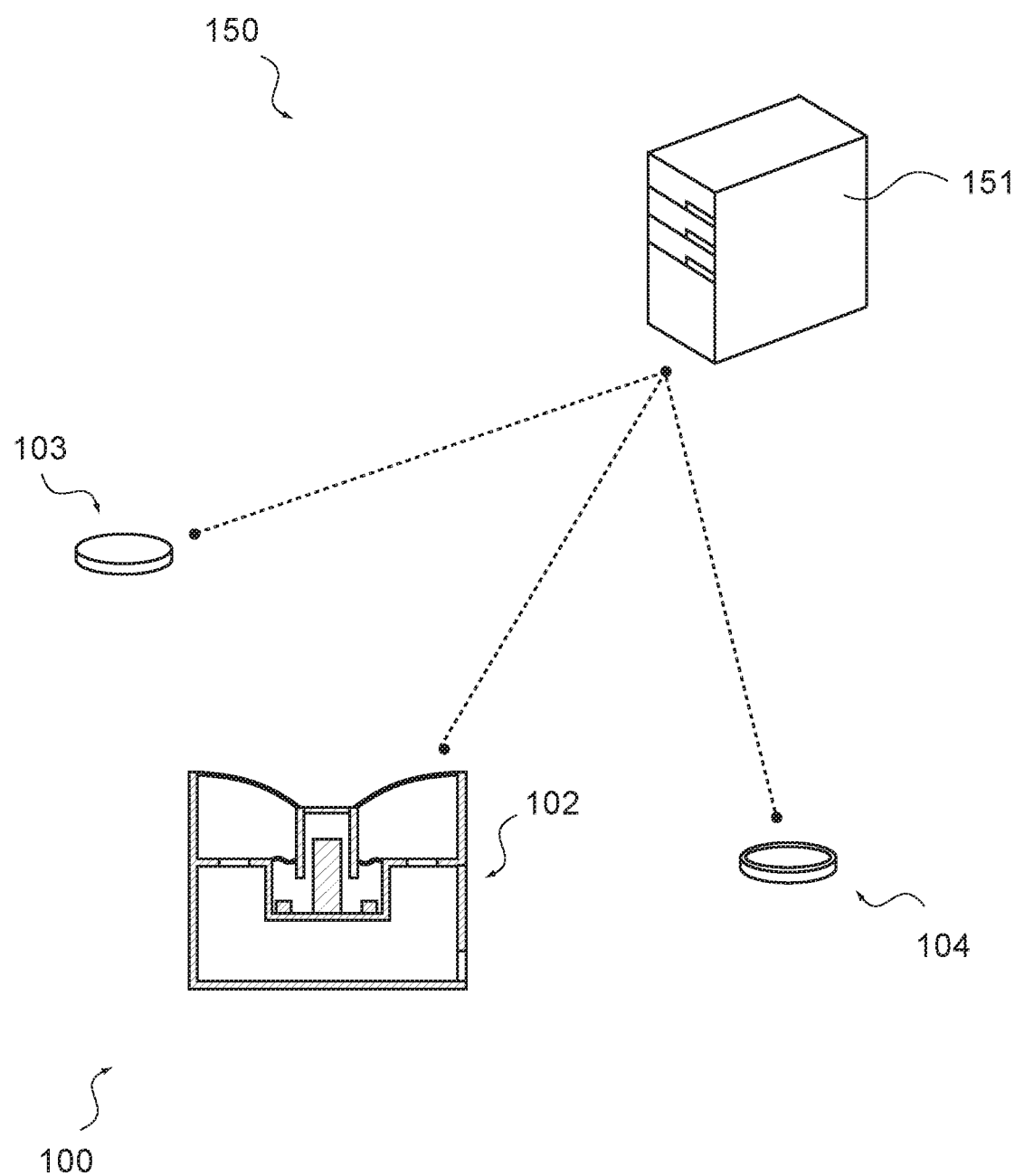
FIG. 6 is a schematic view of a content presentation system according to an embodiment of the present technology.

FIG. 6 is a schematic view of a content presentation system 150 including the content presentation device 100. As illustrated in FIG. 6, the content presentation system 150 includes the content presentation device 100 and an information processing device 151.

The information processing device 151 is any of various types of information processing devices such as a PC, a server device, a smartphone, or a video game machine. The information processing device 151 is configured to be able to communicate with each of the wind presenting device 102, the tactile sense presenting device 103, and the sound presenting device 104 as illustrated in FIG. 6. The communication may be wired communication or wireless communication. Also, it may be communication via a computer network such as the Internet.

Figure 7:
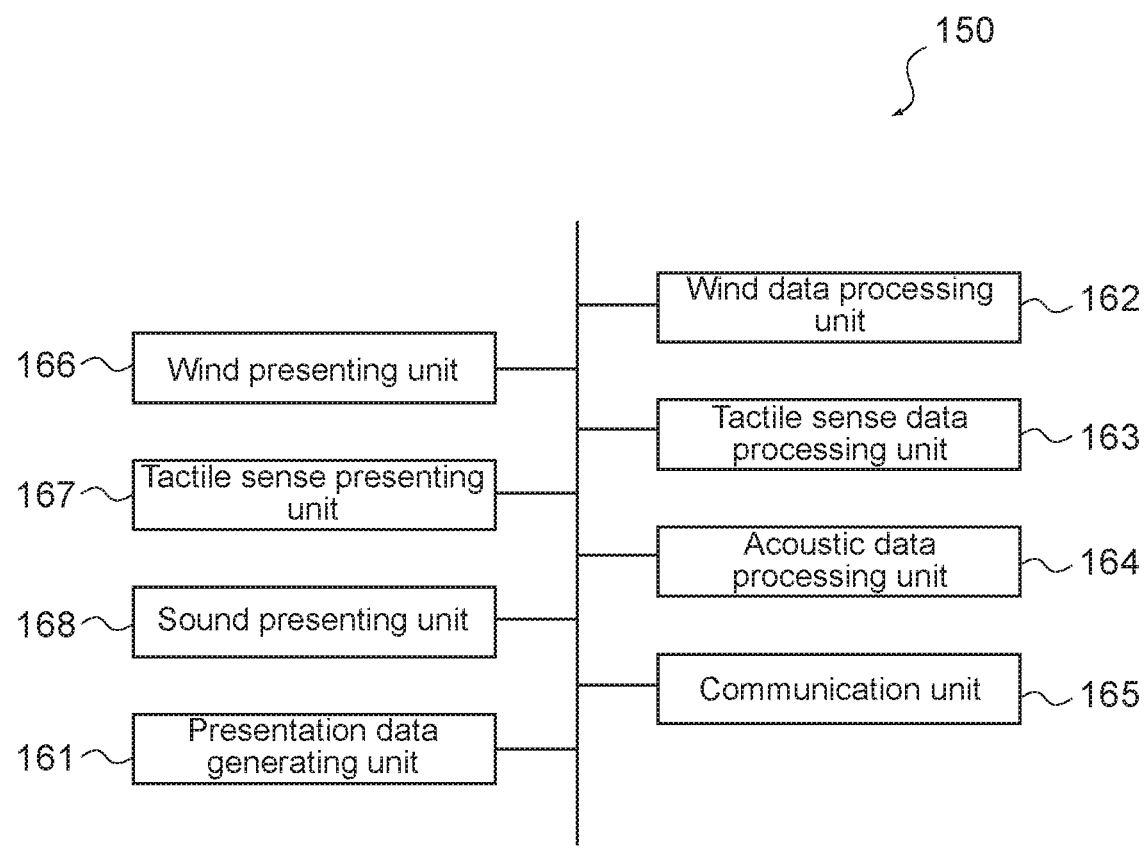
FIG. 7 is a block diagram illustrating a functional configuration of the same content presentation system.

FIG. 7 is a block diagram illustrating a functional configuration of the content presentation system 150. As illustrated in FIG. 7, the content presentation system 150 includes a presentation data generating unit 161, a wind data processing unit 162, a tactile sense data processing unit 163, an acoustic data processing unit 164, a communication unit 165, a wind presenting unit 166, a tactile sense presenting unit 167, and a sound presenting unit 168. The functional configuration is realized by cooperation of hardware and software to be described later.

The presentation data generating unit 161 generates presentation data including wind data, tactile sense data, and acoustic data. The presentation data generating unit 161 can acquire the presentation data from a storage or a server on a network. Further, the presentation data generating unit 161 may estimate the presentation data from various types of content data such as a movie and a game and generate the presentation data.

Specifically, the presentation data generating unit 161 can generate the wind data corresponding to a sound level of content when the sound level exceeds a certain level. Further, the presentation data generating unit 161 may generate the wind data corresponding to an intensity of a motion of video content when the motion becomes intense. Further, the presentation data generating unit 161 may generate the wind data corresponding to a size of an output value of a motion sensor such as an acceleration sensor or a gyro sensor installed on the content presentation device 100.

Figure 8:
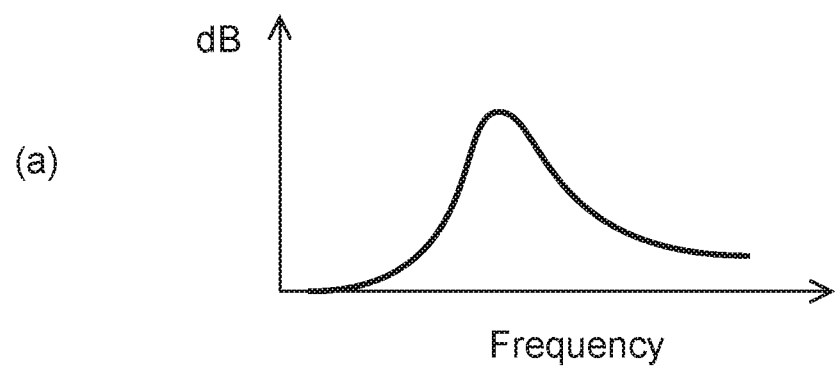
FIG. 8 is a graph illustrating modulation by a wind data processing unit of the same content presentation system.
Figure 8:
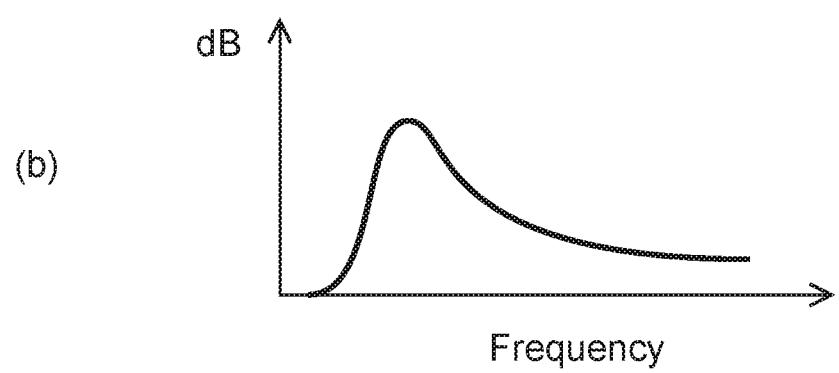
Figure 8:
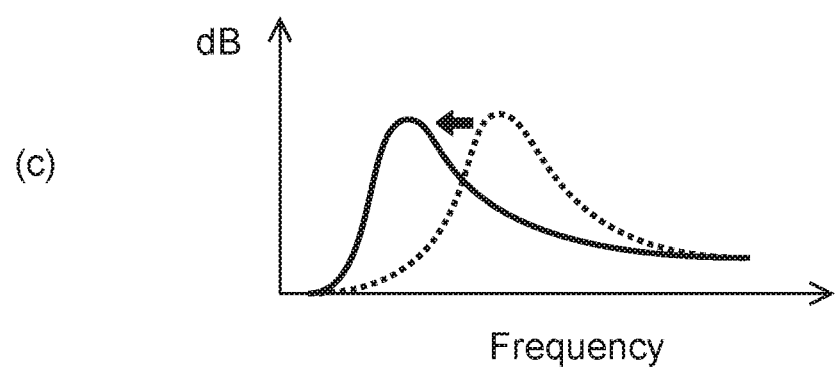

The wind data processing unit 162 processes the wind data generated by the presentation data generating unit 161. The wind data processing unit 162 can modulate the wind data in accordance with a characteristic of the wind presenting device 102. FIG. 8 is a graph illustrating a modulation example by the wind data processing unit 162. FIG. 8(*a*) illustrates an example of a frequency characteristic of the wind data, and FIG. 8(*b*) illustrates an example of a frequency characteristic of the wind presenting device 102.

As described above, when the wind presenting device 102 has an output characteristic in a low frequency region (when the diaphragm drive mechanism is suitable for a slow motion with a large stroke), the frequency characteristic is shifted to the low frequency region as illustrated in FIG. 8(*c*). Similarly, the wind data processing unit 162 shifts the frequency characteristic of the wind data to a high frequency region when the wind presenting device 102 has an output characteristic in a high frequency region (when the diaphragm drive mechanism is suitable for a fast motion with a small stroke).

Also, the wind data processing unit 162 may modulate the wind data on the basis of a sensor value of a sensor installed in the housing 111. Specifically, the wind data processing unit 162 can modulate the wind data in accordance with a sensor value of the barometric pressure sensor installed in the housing 111. For example, the wind data processing unit 162 can decrease the gain level of the wind data when the barometric pressure in the housing 111 is high and increase the gain level of the wind data when the barometric pressure is low.

Figure 9:
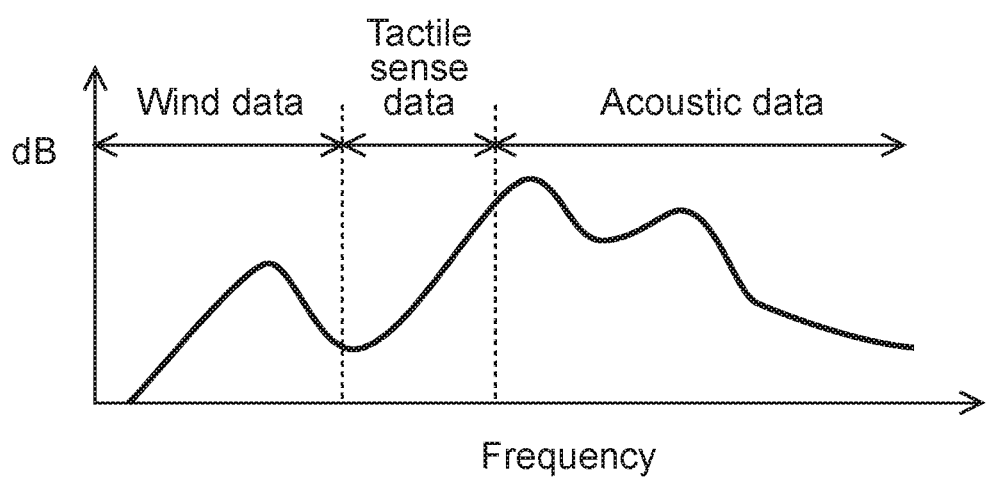
FIG. 9 is a graph illustrating a frequency characteristic of wind data processed by the same content presentation system.

Further, the wind data processing unit 162 may separate data for each frequency region when all the acoustic data, the tactile sense data, and the wind data are included. FIG. 9 is a graph illustrating the frequency characteristic of the wind data. As illustrated in FIG. 9, the wind data processing unit 162 can extract the frequency region corresponding to the wind data. The wind data processing unit 162 supplies the processed wind data to the wind presenting unit 166.

The tactile sense data processing unit 163 processes the tactile sense data generated by the presentation data generating unit 161. The tactile sense data processing unit 163 can modulate the tactile sense data in accordance with the characteristic of the tactile sense presenting device 103. Further, the tactile sense data processing unit 163 can also extract the tactile sense data when all the acoustic data, the tactile sense data, and the wind data are included as illustrated in FIG. 9. The tactile sense data processing unit 163 supplies the processed tactile sense data to the tactile sense presenting unit 167.

The acoustic data processing unit 164 processes the acoustic data generated by the presentation data generating unit 161. The acoustic data processing unit 164 can modulate the acoustic data in accordance with a characteristic of the sound presenting device 104. Also, the acoustic data processing unit 164 can also extract the acoustic data when all the acoustic data, the tactile sense data, and the wind data are included as illustrated in FIG. 9. The acoustic data processing unit 164 supplies the processed acoustic data to the sound presenting unit 168.

The communication unit 165 performs communication between the information processing device 151 and each of the wind presenting device 102, the tactile sense presenting device 103 and the sound presenting device 104. The communication unit 165 may perform communication in a wired or wireless manner as described above.

The wind presenting unit 166 supplies a drive signal to the wind presenting device 102 on the basis of the wind data supplied from the wind data processing unit 162 so that the wind presenting device 102 is operated. Note that, since the presentation of the wind is delayed as compared with the presentation of the tactile sense and the sound, the wind presenting unit 166 may start the wind presentation earlier than the presentation of the tactile sense and the sound by the tactile sense presenting unit 167 and the sound presenting unit 168.

Also, the wind presenting unit 166 can estimate the strength of the wind to be presented on the basis of the output of the barometric pressure sensor installed in the housing 111 and may change the diameter of the opening 111a or the stroke or the frequency of the diaphragm drive mechanism. Further, the wind presenting unit 166 may sense the strength of the wind generated around the wind presenting device 102 and adjust the strength of the wind to be presented so that the user feels a wind of a predetermined strength. Also, the wind presenting unit 166 may output a wind of cancelling a surrounding wind.

Further, the wind presenting unit 166 may cause a plurality of wind presenting devices 102 to cooperate with each other so that a wind flowing from one direction to the other direction while passing through the user is presented. Also, it is possible to give a feeling as if a strong wind is felt by presenting a wind of a predetermined level or more, causing the user to feel a wind between two places by presenting a wind to two places with an interval therebetween, and present a well-modulated wind by emphasizing the strength of the wind.

The tactile sense presenting unit 167 supplies a drive signal to the tactile sense presenting device 103 on the basis of the tactile sense data supplied from the tactile sense data processing unit 163 so that the tactile sense presenting device 103 is operated.

The sound presenting unit 168 supplies driving vibration to the sound presenting device 104 on the basis of the acoustic data supplied from the acoustic data processing unit 164 so that the sound presenting device 104 is operated.

The content presentation system 150 has the functional configuration described above. As described above, with the functional configuration, a signal generating unit that generates drive signals for the wind presenting device 102, the tactile sense presenting device 103 and the sound presenting device 104 is realized. Note that each of the above configurations may be installed in any of the information processing device 151 and the content presentation device 100. Typically, the presentation data generating unit 161 is installed in information processing device 151, and the wind data processing unit 162, the tactile sense data processing unit 163, the acoustic data processing unit 164, the wind presenting unit 166, tactile sense presenting unit 167, and the sound presenting unit 168 may be installed in the content presentation device 100. Also, all of the functional components may be installed in the information processing device 151, or all of the functional components may be installed in the content presentation device 100.

[Operation of Content Presentation System]

Figure 10:
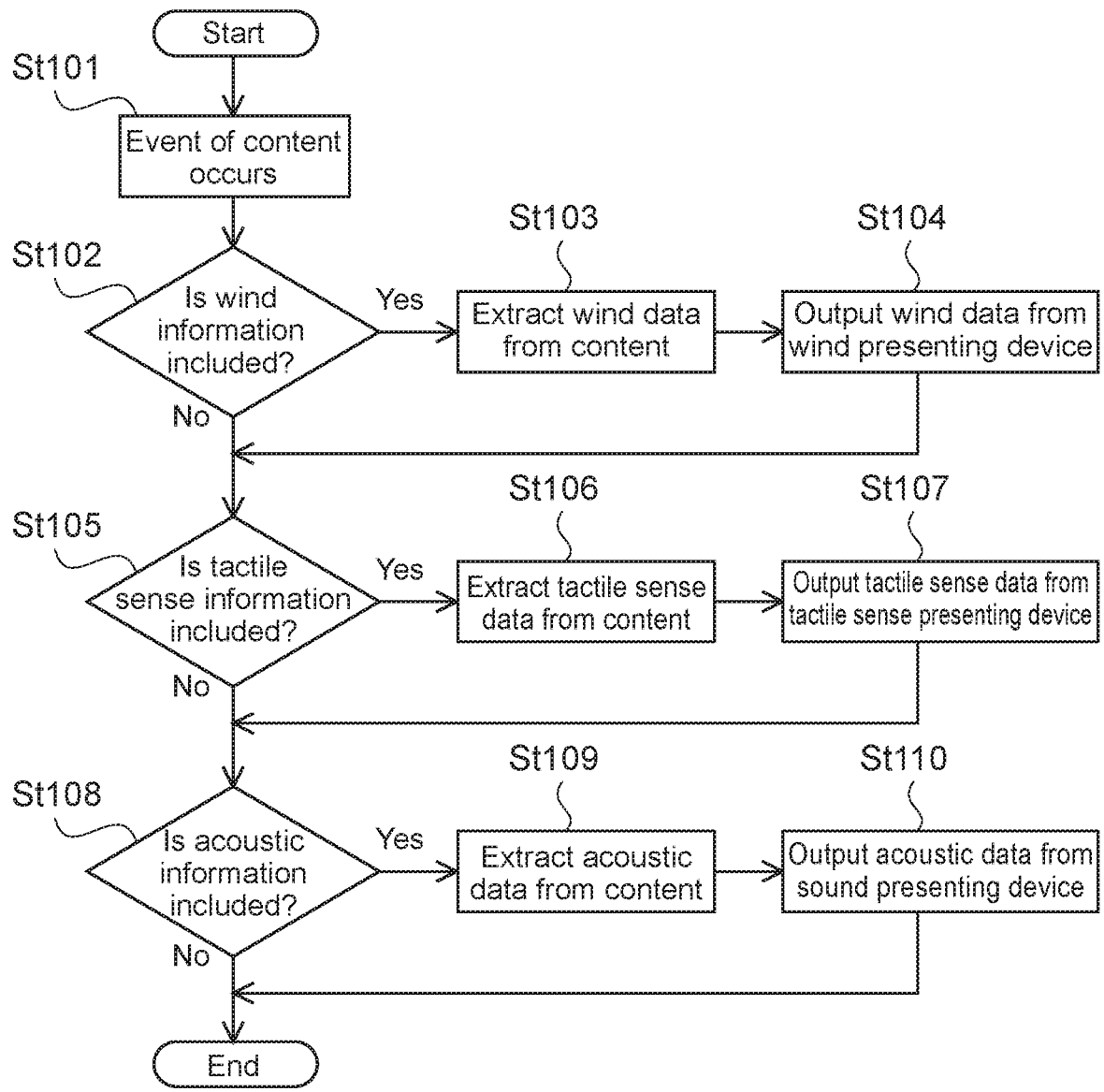
FIG. 10 is a flowchart illustrating an operation of the same content presentation system.

FIG. 10 is a flowchart illustrating an operation of the content presentation system 150. As illustrated in FIG. 10, when an event of content occurs (St101), the presentation data generating unit 161 generates the presentation data including the wind data, the tactile sense data, and the acoustic data using the event as a trigger. The event of the content is, for example, a specific scene of a movie or a game (such as an explosion scene).

If the event includes wind information (St102: Yes), the presentation data generating unit 161 acquires the wind data from the content (St103) and supplies the wind data to the wind data processing unit 162. The wind data processing unit 162 processes the wind data and supplies the processed wind data to the wind presenting unit 166 so that the wind presenting device 102 is operated (St104).

After the operation of the wind presenting device 102 or when an event does not include the wind information (St102: No) and the tactile sense information is included in the event (St105: Yes), the presentation data generating unit 161 acquires the tactile sense data from the content (St106) and supplies the tactile sense data to the tactile sense data processing unit 163. The tactile sense data processing unit 163 processes the tactile sense data and supplies the processed tactile sense data to the tactile sense presenting unit 167 so that the tactile sense presenting device 103 is operated (St107).

After the operation of the tactile sense presenting device 103 or when the event does not include the tactile sense information (No in St105) and the event includes acoustic information (St108: Yes), the presentation data generating unit 161 acquires the acoustic data from the content (S109) and supplies the acoustic data to the acoustic data processing unit 164. The acoustic data processing unit 164 processes the acoustic data and supplies the processed acoustic data to the sound presenting unit 168 so that the sound presenting device 104 is operated (St110).

Figure 11:
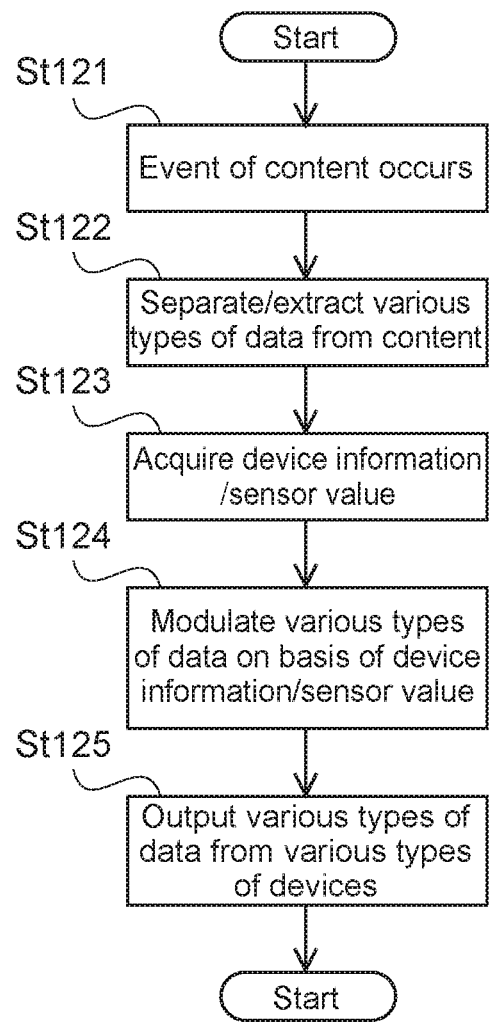
FIG. 11 is a flowchart illustrating another operation of the same content presentation system.

FIG. 11 is a flowchart illustrating another operation of the content presentation system 150. As illustrated in FIG. 11, when an event of content occurs (St121), the presentation data generating unit 161 separates the wind data, the tactile sense data, and the acoustic data from the content using the event as a trigger, or the wind data processing unit 162, the tactile sense data processing unit 163, and the acoustic data processing unit 164 extract the respective pieces of data (St122).

The wind data processing unit 162, the tactile sense data processing unit 163, and the acoustic data processing unit 164 acquire either or both of device information and the sensor value of the wind presenting device 102, the tactile sense presenting device 103, and the sound presenting device 104 (St123).

Then, the wind data processing unit 162, the tactile sense data processing unit 163, and the acoustic data processing unit 164 modulate various types of data on the basis of the device information and the sensor value (St124). The wind data processing unit 162 supplies the processed wind data to the wind presenting unit 166 so that the wind presenting device 102 is operated (St125). Also, the tactile sense data processing unit 163 supplies the processed tactile sense data to the tactile sense presenting unit 167 so that the tactile sense presenting device 103 is operated (St125). Also, the acoustic data processing unit 164 supplies the processed acoustic data to the sound presenting unit 168 so that the sound presenting device 104 is operated (St125).

The content presentation system 150 performs the operation described above. Accordingly, the wind presenting device 102, the tactile sense presenting device 103, and the sound presenting device 104 operate in cooperation with each other with the event in the content, so that user experience associated with the content can be provided to the user (see an application example to be described later). Note that the content presentation system 150 need not necessarily present all of the wind, the tactile sense, and the sound to the user at the same time and may present them to the user at different timings. Also, the content presentation system 150 may present a visual sense to the user in addition to the wind, the tactile sense, and the sound.

[Other Configuration of Wind Presenting Device]

The configuration of the wind presenting device 102 is not limited to the example described above and may have the following configurations. FIGS. 12 to 16 are schematic views illustrating other configurations of the wind presenting device 102.

Figure 12:
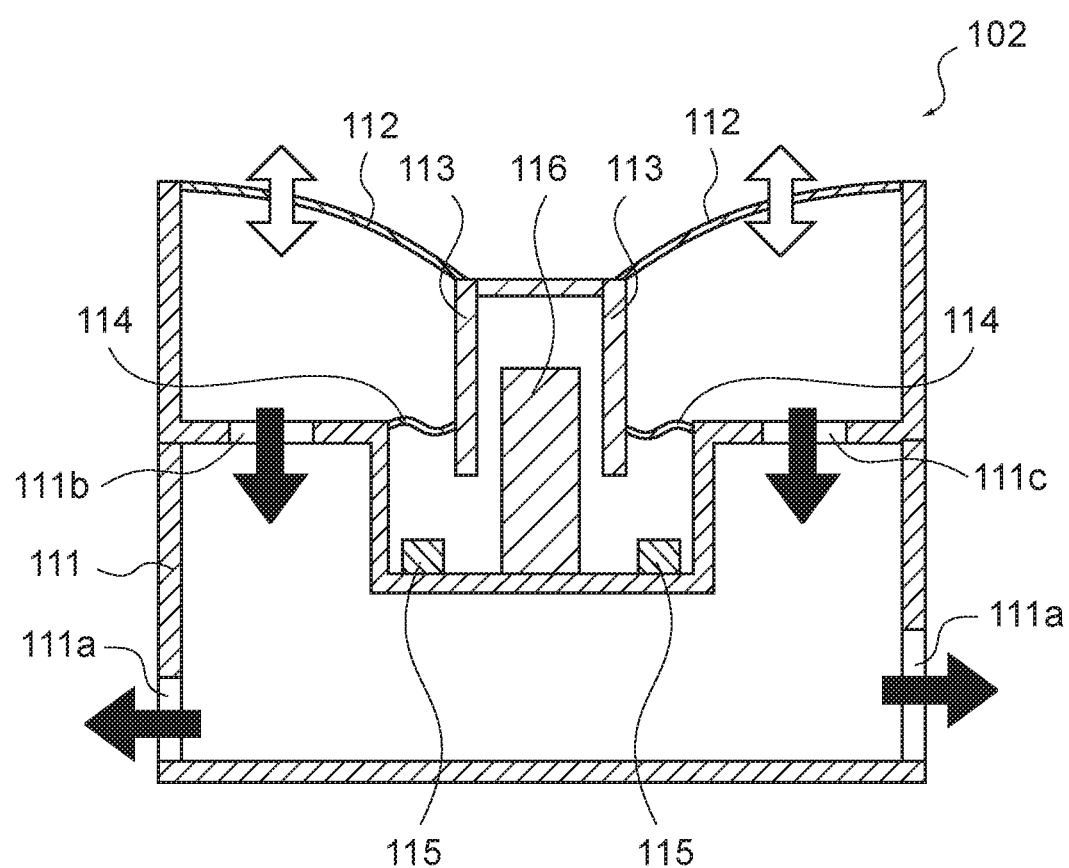
FIG. 12 is a schematic view of a wind presenting device having another configuration according to an embodiment of the present technology.

The housing 111 may include a plurality of openings 111a as illustrated in FIG. 12. Since a plurality of openings 111a are formed in the housing 111, it is possible to simultaneously perform air blow in a plurality of directions. The number of openings may be two or more. Also, when the plurality of openings 111a have different opening sizes or shape, it is possible to simultaneously output winds with different characteristics from the plurality of openings 111a. For example, it is possible to output a wind with a slow wind speed from an opening 111a with a large opening diameter and output a wind with a high wind speed from an opening 111a with a small opening diameter.

Figure 13:
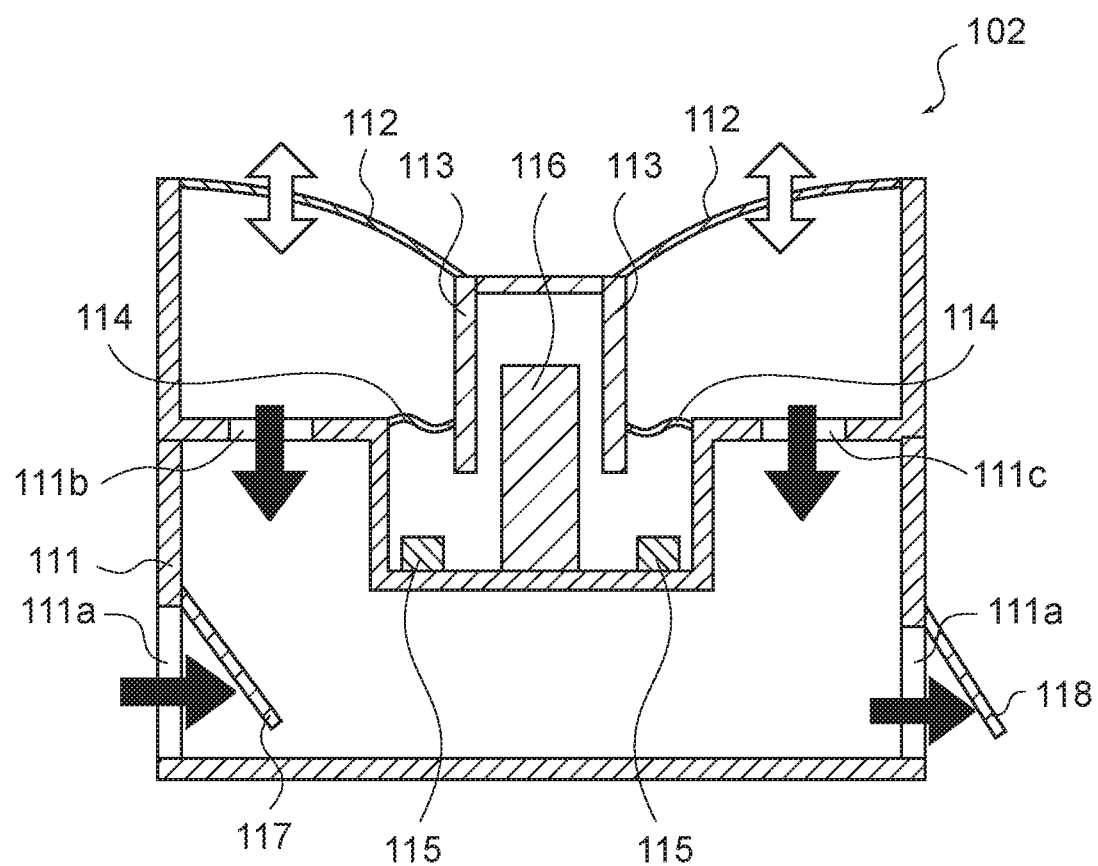
FIG. 13 is a schematic view of a wind presenting device having another configuration according to an embodiment of the present technology.

Further, a check valve 117 and a check valve 118 may be installed in the two openings 111a as illustrated in FIG. 13. The check valve 117 is a valve for passing the wind flowing from the outside of the housing to the inside of the housing, and the check valve 118 is a valve for passing the wind flowing from outside the housing to the outside of the housing. As indicated by arrows in FIG. 13, the opening 111a including with the check valve 117 can be dedicated to intake, and the opening 111a including the check valve 118 can be dedicated to exhaust.

Since the wind flows in one direction as compared with a case in which one opening 111a is formed, the output wind can reach far, and it is possible to increase the output intensity of the wind. Further, the responsiveness of the wind is improved, and the wind frequency (the number of air blasts and stops per unit time) can be increased (the interval can be decreased).

Figure 14:
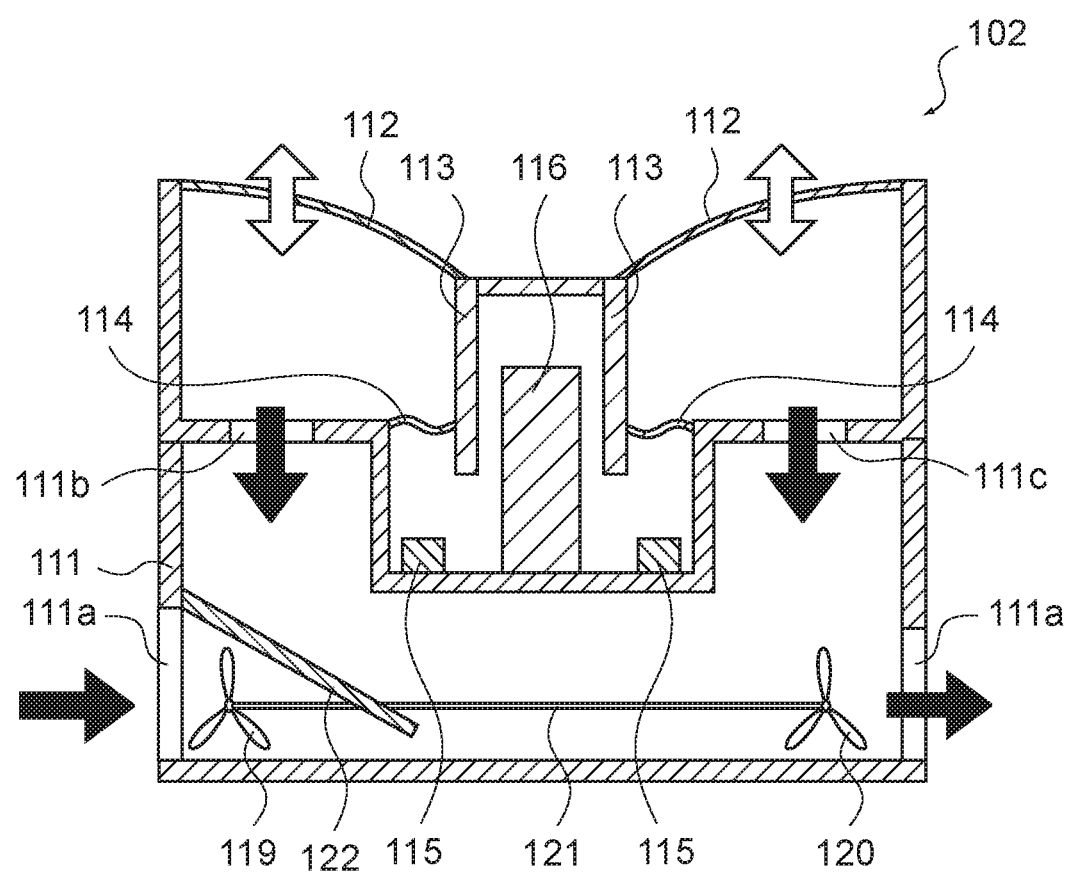
FIG. 14 is a schematic view of a wind presenting device having another configuration according to an embodiment of the present technology.

Also, a propeller 119 and a propeller 120 may be installed in the two openings 111a as illustrated in FIG. 14. The propeller 119 and the propeller 120 are not connected to the power, are connected to each other by a common shaft 121 and are configured to rotate in the same direction. As described above, one of the openings 111a can be dedicated to intake, and the other can be dedicated to exhaust. Further, as illustrated in FIG. 14, a duct structure 122 whose diameter gradually decreases may be installed in the opening 111a on the intake side. Accordingly, a function like a check valve can be realized.

Also in this configuration, since the wind flows in one direction as compared with a case in which one opening 111a is formed, the output wind can reach far, and it is possible to increase the output intensity of the wind. Further, the responsiveness of the wind is improved, and the wind frequency (the number of air blasts and stops per unit time) can be increased (the interval can be decreased).

Figure 15:
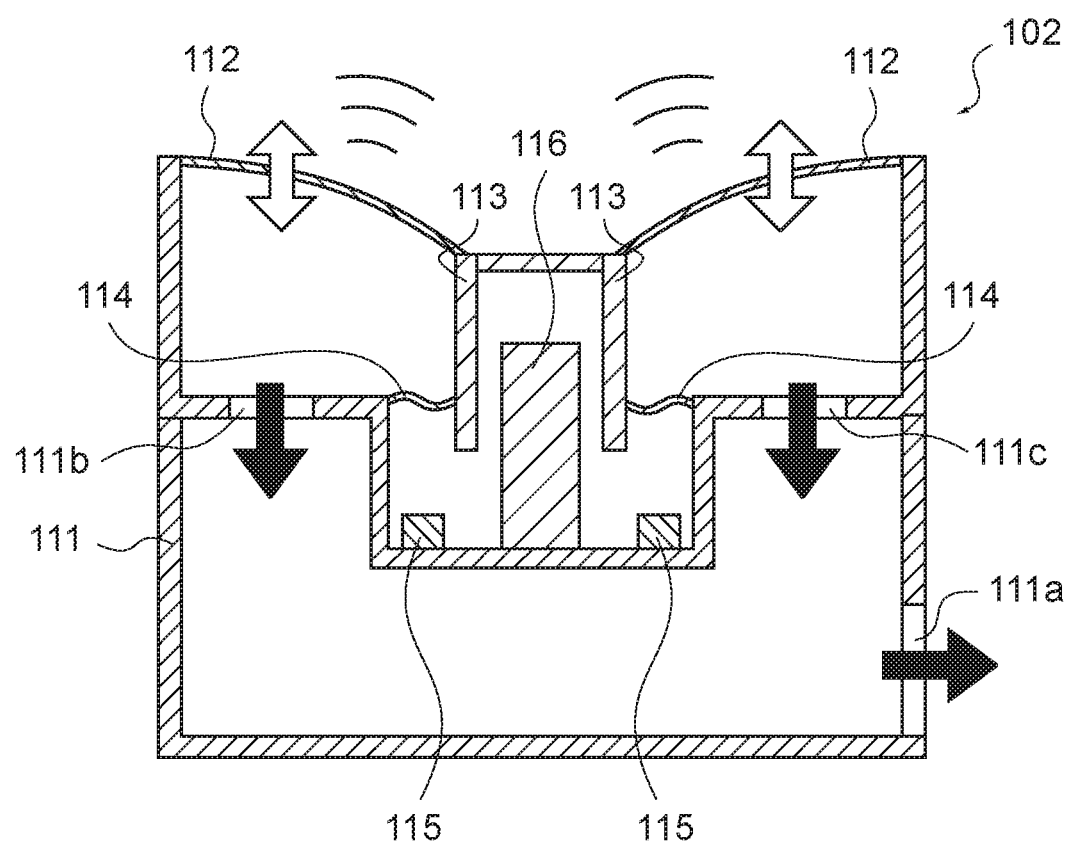
FIG. 15 is a schematic view of a wind presenting device having another configuration according to an embodiment of the present technology.

Also, it is also possible to simultaneously output both the wind and the sound using the diaphragm 112 as illustrated in FIG. 15. In this case, the wind data processing unit 162 can use the low frequency region for the wind presentation in the analog signal input to the wind presenting unit 166 and use the high frequency region for the sound presentation. Also, the wind presenting device 102 may be configured to be able to switch between a sound output mode and a wind output mode. In the sound output mode, the sound can be output up to the high frequency region by increasing the diameter of the opening 111a. In the case of the wind output mode, the diameter of the opening 111a can be reduced.

Figure 16:
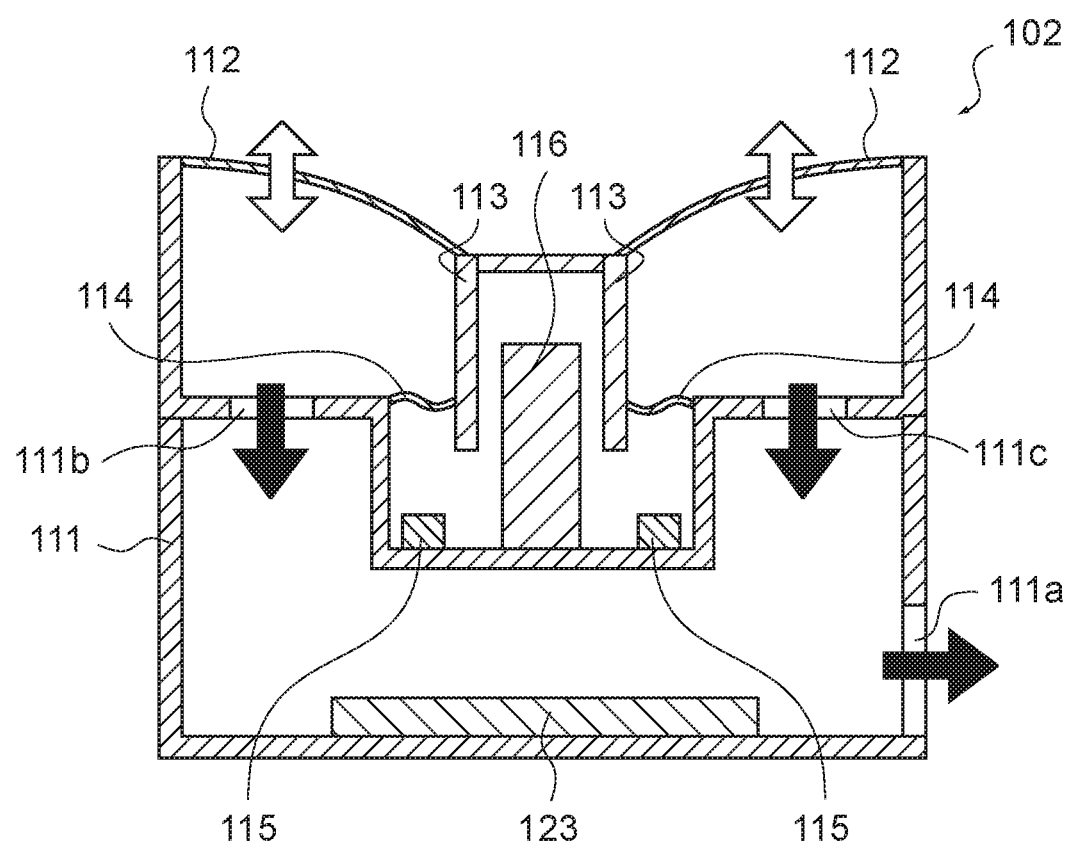
FIG. 16 is a schematic view of a wind presenting device having another configuration according to an embodiment of the present technology.

Also, a temperature changing element 123 may be installed in the housing 111 as illustrated in FIG. 16. It is desirable that the temperature changing element 123 be able to change the temperature of the air in the housing 111, and either or both of a heating element and a cooling element may be used. The heating element is, for example, a heating wire, and the cooling element is, for example, a Peltier element. It is possible to send cool air or warm air to the user by changing the temperature of the air in the housing 111 through the temperature changing element 123.

When the wind presenting device 102 includes the temperature changing element 123, the wind data processing unit 162 can modulate the wind data in accordance with the sensor value of the temperature sensor installed in the housing 111. For example, the wind data processing unit 162 can decrease the temperature value of the wind data so that the cold wind is output when the temperature in the housing 111 is high and increase the temperature value of the wind data so that the warm wind is output when the temperature is low. For example, the wind data processing unit 162 can also modulate the wind data in accordance with the substance of content so that the warm wind is output in a situation of a tropical environment and the cold wind is output in a situation of a cold zone environment.

[Other Configuration of Content Presentation Device]

Figure 17:
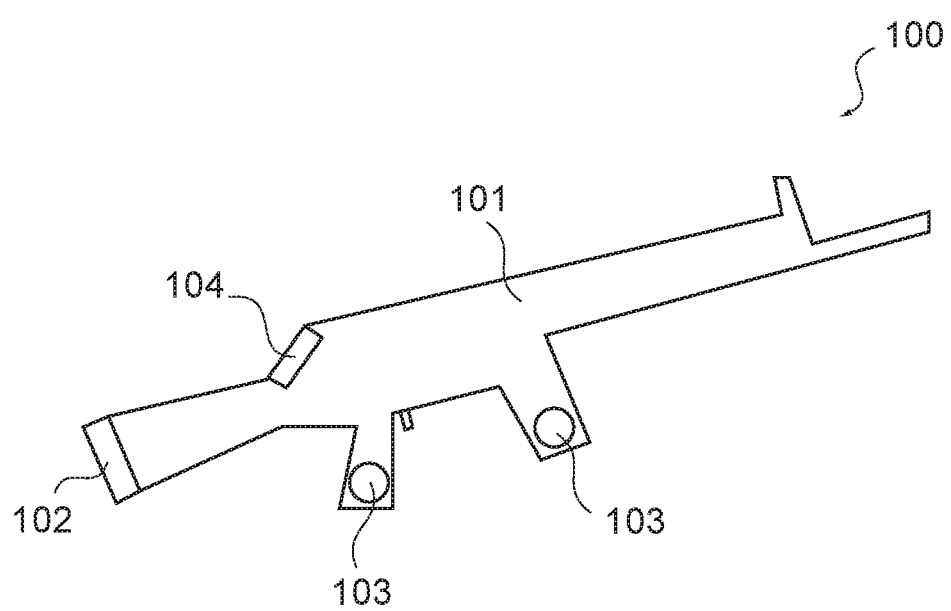
FIG. 17 is a schematic view of a content presentation device having another configuration according to an embodiment of the present technology.

In the above description, the content presentation device 100 is a vest type device which can be worn by the user U, but the present disclosure is not limited thereto. FIG. 17 is a schematic view of a content presentation device 100 having another configuration. The content presentation device 100 illustrated in FIG. 17 is configured such that the wind presenting device 102, the tactile sense presenting device 103, and the sound presenting device 104 are installed in a gun type support member 101. Accordingly, for example, the wind is presented to the user together with the tactile sense and the sound at the same time as when a trigger of a gun is pulled, so that it is possible to cause the user to feel the air blast at the time of firing.

In addition, the content presentation device 100 may be various types of devices which can be worn or gripped by the user such as a smartphone, a tactile sense glove, an electrical tactile sense device, a motion controller, and a game pad.

Application Example

Figure 18:
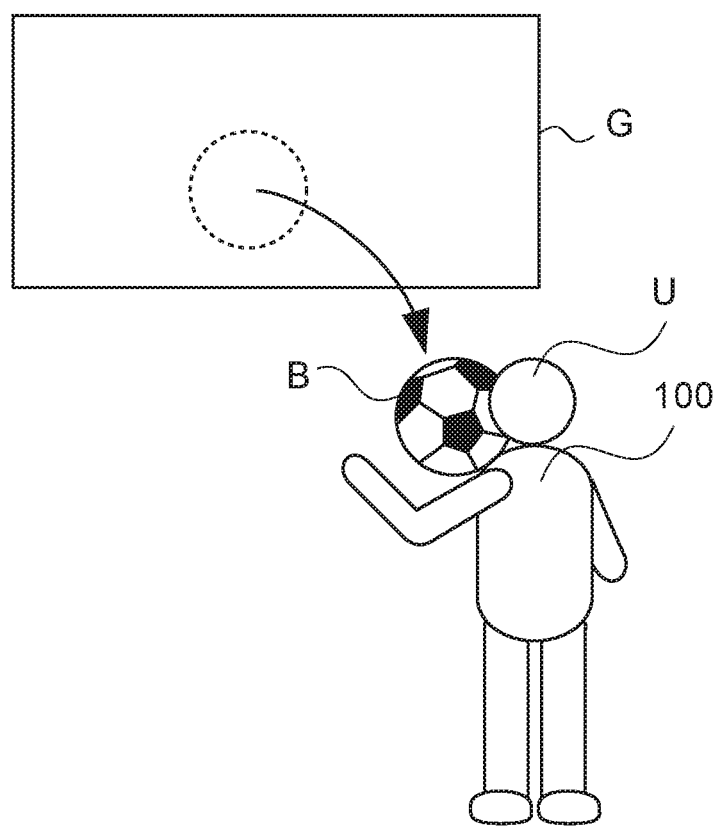
FIG. 18 is a schematic view illustrating an application example of a content presentation system according to an embodiment of the present technology.
Figure 19:
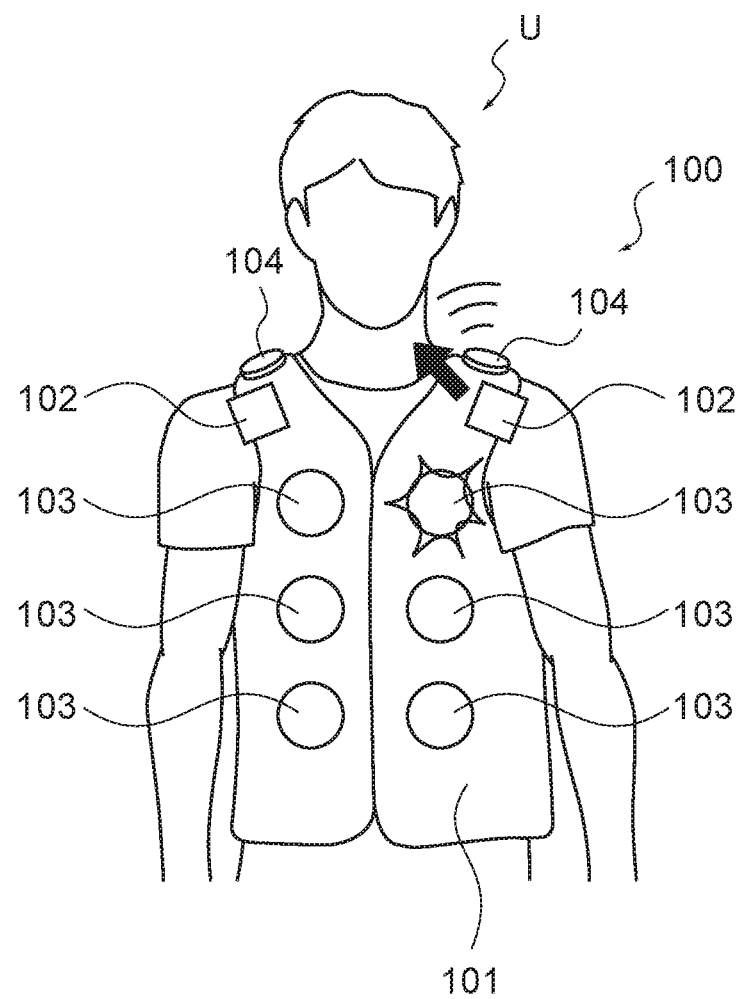
FIG. 19 is a schematic view illustrating an application example of a content presentation system according to an embodiment of the present technology.

FIGS. 18 and 19 are schematic diagrams illustrating an application example of the content presentation system 150. As illustrated in FIG. 18, a video effect that a ball (virtual object) B which can jump out of a screen G flies out to a user U is performed when the user U wearing the best type content presentation device 100 is watching 3D content.

If the ball that jumps out collides with the body of the user U, and a collision event occurs, the content presentation system 150 causes a plurality of tactile sense presenting devices 103 to cooperate with each other at the same time as the collision event and causes a collision feeling to be output from the tactile sense presenting device 103 so that a collision position is recalled illustrated in FIG. 19. Also, the content presentation system 150 causes a plurality of sound presenting devices 104 to cooperate with each other at the same time as the collision event and causes a collision sound to be output from the sound presenting device 104 so that the collision position is recalled.

Further, the content presentation system 150 causes a plurality of wind presenting devices 102 to cooperate with each other at the same time as the collision event and causes the wind to be output from the wind presenting device 102 (an arrow in FIG. 19) so that the collision position is recalled. Accordingly, the user can experience the collision event through the wind in addition to the tactile sense and the sound.

Figure 20:
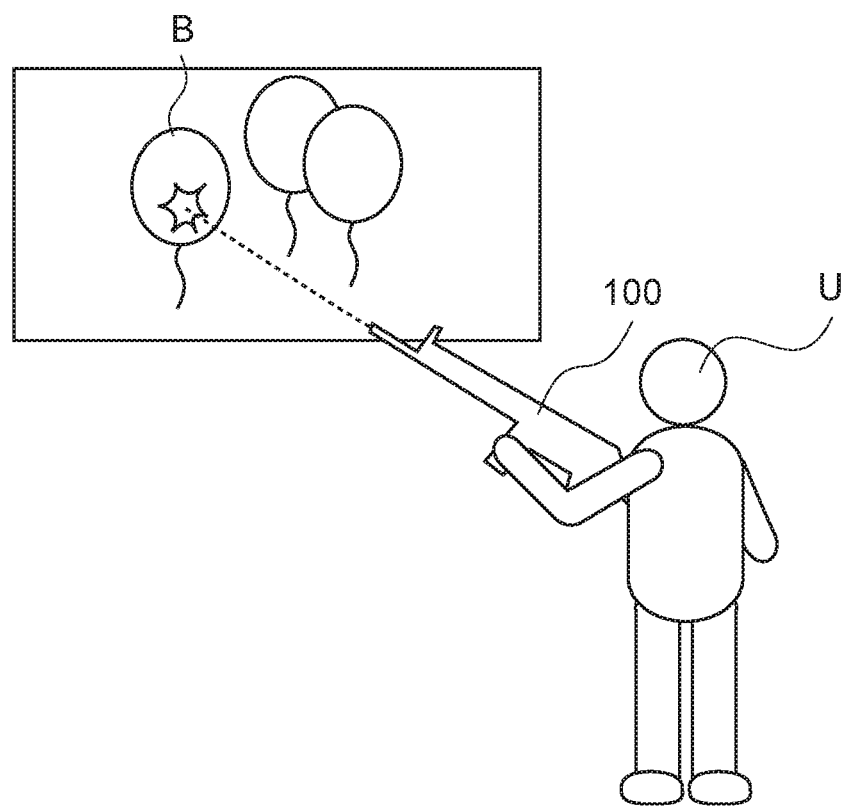
FIG. 20 is a schematic view illustrating an application example of a content presentation system according to an embodiment of the present technology.
Figure 21:
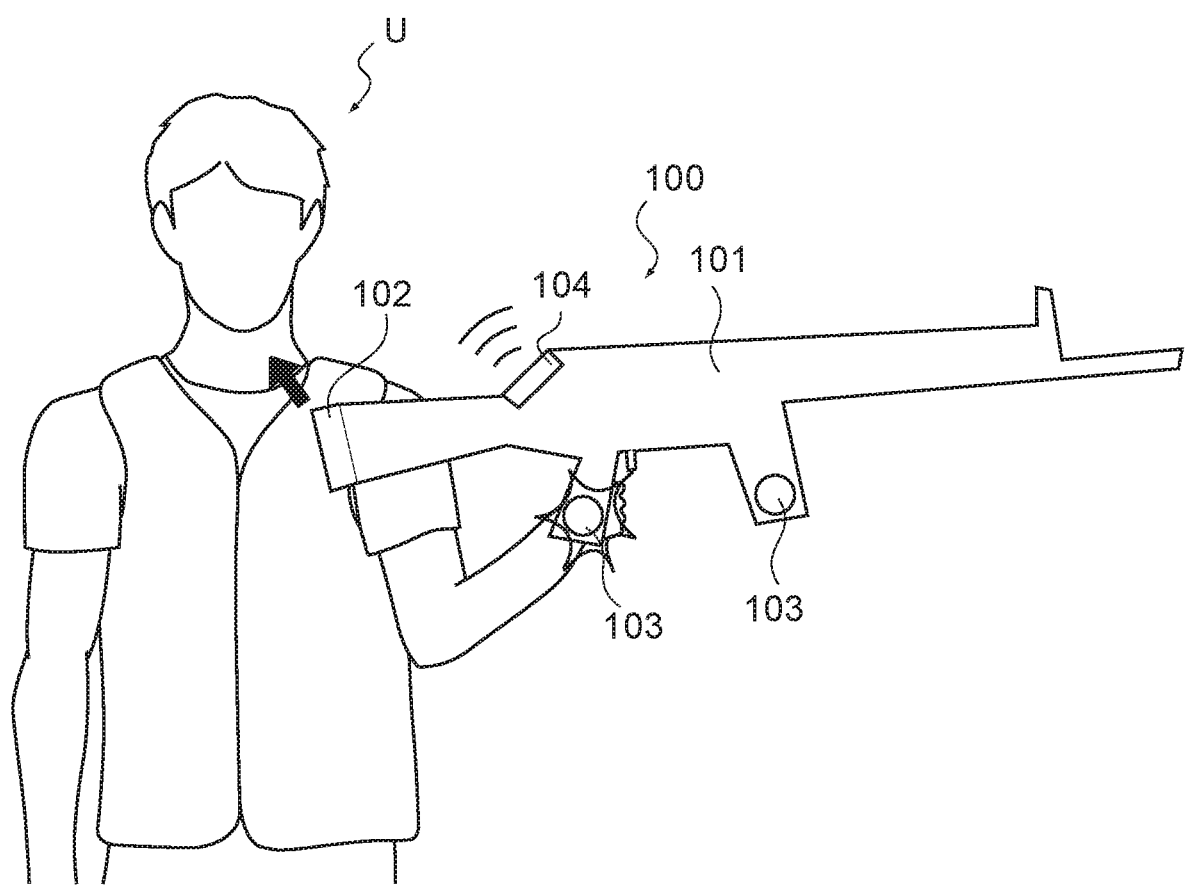
FIG. 21 is a schematic view illustrating an application example of a content presentation system according to an embodiment of the present technology.

FIGS. 20 and 21 are schematic diagrams illustrating another application example of the content presentation system 150. As illustrated in FIG. 20, when a user U holding the gun type content presentation device 100 is watching 3D content, an event of directing a muzzle toward a target (virtual object) B in a screen G, pulling a trigger, and fire occurs.

At the same time as the firing event, the content presentation system 150 causes the tactile sense presenting device 103 to vibrate and causes a firing sound to be output from the sound presenting device 104 as illustrated in FIG. 21. Also, the content presentation system 150 causes the wind to be output from the wind presenting device 102 at the same time as the firing event (an arrow in FIG. 21). Accordingly, the user can experience the firing event through the wind in addition to the tactile sense and the sound.

[Hardware Configuration]

Figure 22:
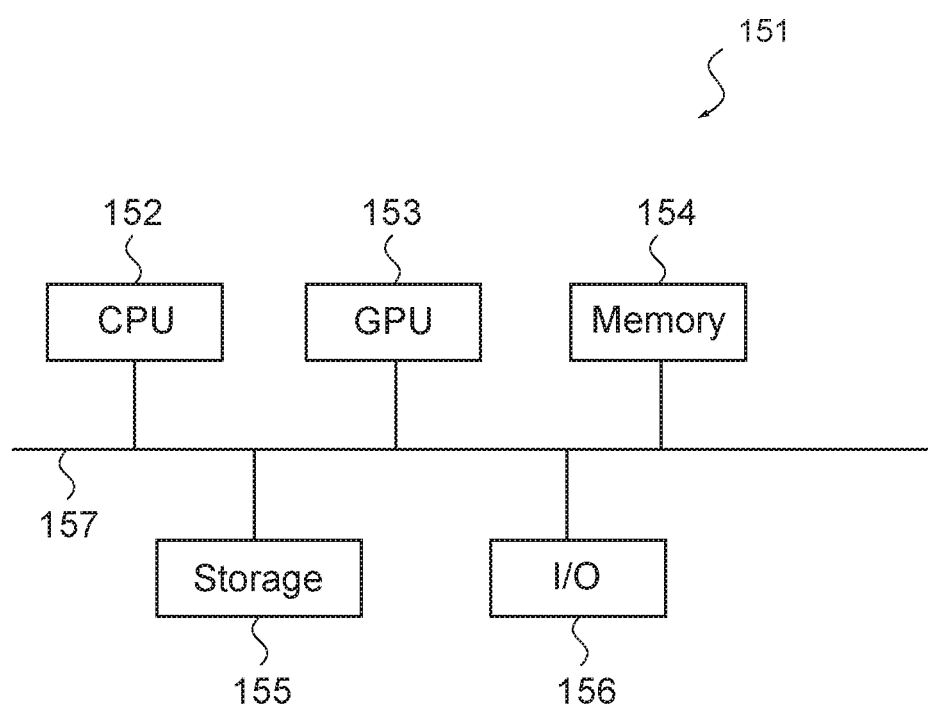
FIG. 22 is a block diagram illustrating a hardware configuration of a content presentation system according to an embodiment of the present technology.

FIG. 22 is a schematic view illustrating a hardware configuration of the information processing device 151. The information processing device 151 has a central processing unit (CPU) 152, a graphic processing unit (GPU) 153, a memory 154, a storage 155, and an input/output unit (I/O) 156 as hardware components as illustrated in FIG. 22. These components are connected to one another via a bus 157.

The CPU 152 controls the other components in accordance with a program stored in the memory 154, performs data processing in accordance with the program, and stores a processing result in the memory 154. The CPU 152 can be a microprocessor.

The GPU 153 executes image processing under the control of the CPU 152. The GPU 153 can be a microprocessor.

The memory 154 stores programs and data executed by the CPU 152. The memory 154 can be a random-access memory (RAM).

The storage 155 stores programs and data. The storage 155 can be a hard disk drive (HDD) or a solid-state drive (SSD).

The input/output unit 156 receives an input to the information processing device 151 and supplies an output of the information processing device 151 to the outside. The input/output unit 156 includes an input device such as a keyboard or a mouse, an output device such as a display, and a connection interfaces such as a network.

The hardware components of the information processing device 151 are not limited to the components described here as long as the functional configuration of the information processing device 151 can be realized. Also, some or all of the hardware components may be installed on a network.

Note that the present technology can also have the following configurations.

(1) A content presentation system, including:
a signal generating unit that generates a wind presentation drive signal on the basis of a predetermined trigger included in content; and
a wind presenting device including a housing including an opening formed therein, a diaphragm supported by the housing, and a diaphragm drive mechanism that drives the diaphragm on the basis of the wind presentation drive signal, reduces a volume of a space formed by the housing and the diaphragm, and causes air in the space to blast from the opening.

(2) The content presentation system according to (1), in which
the signal generating unit includes a presentation data generating unit that generates wind data from the content, a wind data processing unit that modulates the wind data in tune with the wind presenting device, and a wind presenting unit that generates the wind presentation drive signal on the basis of the wind data modulated by the wind data processing unit.

(3) The content presentation system according to (1) or (2), further including a tactile sense presenting device that presents a tactile sense to a user, in which
the signal generating unit generates a tactile sense presentation drive signal on the basis of a predetermined trigger included in the content, and
the tactile sense presenting device presents the tactile sense to the user in accordance with the tactile sense presentation drive signal.

(4) The content presentation system according to any one of (1) to (3), further including a sound presenting device that presents a sound to the user, in which
the signal generating unit generates a sound presentation drive signal on the basis of a predetermined trigger included in the content, and
the sound presenting device presents a sound to the user in accordance with the sound presentation drive signal.

(5) The content presentation system according to any one of (1) to (4), in which
the opening includes a plurality of openings.

(6) The content presentation system according to any one of (1) to (4), in which
the opening includes a first opening and a second opening, and
the wind presenting device further includes a first check valve for passing air flowing into the housing from the first opening and a second check valve for passing air to blast from the second opening.

(7) The content presentation system according to (1) to (4), in which
the opening includes a first opening and a second opening, and
the wind presenting device further includes a first propeller for passing air flowing into the housing from the first opening, a second propeller for passing air to blast from the second opening, and a common shaft of the first propeller and the second propeller.

(8) The content presentation system according to (1) to (7), in which
the wind presenting device generates a sound by vibration of the diaphragm.

(9) The content presentation system according to (1) to (8), in which
the wind presenting device further includes a temperature changing element which is installed in the housing and changes a temperature of the air in the space.

(10) The content presentation system according to (9), in which
the signal generating unit changes the temperature of the temperature changing element on the basis of the content.

(11) The content presentation system according to any one of (1) to (10), in which
the wind presenting device further includes a barometric pressure sensor which is installed in the housing and measures barometric pressure in the space, and the signal generating unit generates a wind presentation drive signal on the basis of an output of the barometric pressure sensor.

(12) The content presentation system according to any one of (1) to (11), in which
the wind presenting device further includes a temperature sensor which is installed in the housing and measures a temperature in the space, and
the signal generating unit generates a wind presentation drive signal on the basis of the output of the temperature sensor.

(13) The content presentation system according to any one of (1) to (12), in which
the wind presenting device includes a valve capable of opening and closing the opening, and
the signal generating unit controls the diaphragm drive mechanism such that the barometric pressure in the space is increased, and the valve is opened on the basis of a predetermined trigger included in the content.

(14) A content presentation device, including:
a wind presenting device including a housing including an opening formed therein, a diaphragm supported by the housing, and a diaphragm drive mechanism that drives the diaphragm, reduces a volume of a space formed by the housing and the diaphragm, and causes air in the space to blast from the opening;
a tactile sense presenting device that presents a tactile sense to a user; and
a sound presenting device that presents a sound to the user.

(15) A wind presenting device, including:
a housing including an opening formed therein;
a diaphragm supported by the housing; and
a diaphragm drive mechanism that drives the diaphragm, reduces a volume of a space formed by the housing and the diaphragm, and causes air in the space to blast from the opening.

REFERENCE SIGNS LIST 100 content presentation device
101 support member
102 wind presenting device
103 tactile sense presenting device
104 sound presenting device
111 housing
112 diaphragm
113 coil
114 damper
115 magnet
116 axis core
117 check valve
118 check valve
119, 120 propeller
121 common shaft
122 duct structure
123 temperature changing element
150 content presentation system
161 presentation data generating unit
162 wind data processing unit
163 tactile sense data processing unit
164 acoustic data processing unit
165 communication unit
166 wind presenting unit
167 tactile sense presenting unit
168 sound presenting unit

The invention claimed is:
1. A content presentation system, comprising:
a signal generating unit configured to generate a wind presentation drive signal based on a predetermined trigger included in a content; and
a wind presenting device including
a housing including an opening formed therein,
a diaphragm supported by the housing, and
a diaphragm drive mechanism configured to drive the diaphragm based on the wind presentation drive signal, reduce a volume of a space formed by the housing and the diaphragm, and cause air in the space to blast from the opening,
wherein the opening includes a first opening and a second opening, and
wherein the wind presenting device further includes a first propeller for passing air flowing into the housing from the first opening, a second propeller for passing air to blast from the second opening, and a common shaft of the first propeller and the second propeller.

2. The content presentation system according to claim 1, wherein
the signal generating unit includes
a presentation data generating unit configured to generate wind data from the content,
a wind data processing unit configured to modulate the wind data in tune with the wind presenting device, and
a wind presenting unit configured to generate the wind presentation drive signal based on the wind data modulated by the wind data processing unit.

3. The content presentation system according to claim 1, further comprising:
a tactile sense presenting device configured to present a tactile sense to a user, wherein
the signal generating unit is further configured to generate a tactile sense presentation drive signal based on a predetermined tactile sense trigger included in the content, and
the tactile sense presenting device presents the tactile sense to the user in accordance with the tactile sense presentation drive signal.

4. The content presentation system according to claim 1, further comprising:
a sound presenting device configured to present a sound to the user, wherein
the signal generating unit is further configured to generate a sound presentation drive signal based on a predetermined sound trigger included in the content, and
the sound presenting device presents the sound to the user in accordance with the sound presentation drive signal.

5. The content presentation system according to claim 1, wherein
the wind presenting device further includes a first check valve for passing air flowing into the housing from the first opening and a second check valve for passing air to blast from the second opening.

6. The content presentation system according to claim 1, wherein
the wind presenting device is configured to generate a sound by vibration of the diaphragm.

7. The content presentation system according to claim 1, wherein
the wind presenting device further includes a temperature changing element which is installed in the housing and is configured to change a temperature of the air in the space.

8. The content presentation system according to claim 7, wherein
the signal generating unit is further configured to generate a temperature change signal to control the temperature of the temperature changing element based on the content.

9. The content presentation system according to claim 1, wherein
the wind presenting device further includes a barometric pressure sensor which is installed in the housing and is configured to measure barometric pressure in the space, and
the signal generating unit generates the wind presentation drive signal based on an output of the barometric pressure sensor.

10. The content presentation system according to claim 9, wherein
the wind presenting device includes a valve configured to open and close the opening, and
the signal generating unit controls the diaphragm drive mechanism such that the barometric pressure in the space is increased, and the valve is opened based on the predetermined trigger included in the content.

11. The content presentation system according to claim 1, wherein
the wind presenting device further includes a temperature sensor which is installed in the housing and is configured to measure a temperature in the space, and
the signal generating unit generates the wind presentation drive signal based on
the output of the temperature sensor.

12. A content presentation device, comprising:
a wind presenting device including
a housing including an opening formed therein,
a diaphragm supported by the housing, and
a diaphragm drive mechanism configured to drive the diaphragm, reduce a volume of a space formed by the housing and the diaphragm, and cause air in the space to blast from the opening;
a tactile sense presenting device configured to present a tactile sense to a user; and
a sound presenting device configured to present a sound to the user,
wherein the opening includes a first opening and a second opening, and
wherein the wind presenting device further includes a first propeller for passing air flowing into the housing from the first opening, a second propeller for passing air to blast from the second opening, and a common shaft of the first propeller and the second propeller.

13. A wind presenting device, comprising:
a housing including an opening formed therein;
a diaphragm supported by the housing; and
a diaphragm drive mechanism configured to drive the diaphragm, reduce a volume of a space formed by the housing and the diaphragm, and cause air in the space to blast from the opening;
wherein the opening includes a first opening and a second opening, and
wherein the wind presenting device further includes a first propeller for passing air flowing into the housing from the first opening, a second propeller for passing air to blast from the second opening, and a common shaft of the first propeller and the second propeller.

* * * * *